C. J. McLEOD.
COIN CONTROLLED WEIGHING MACHINE.
APPLICATION FILED NOV. 9, 1906.
930,876.
Patented Aug. 10, 1909.
4 SHEETS—SHEET 3.
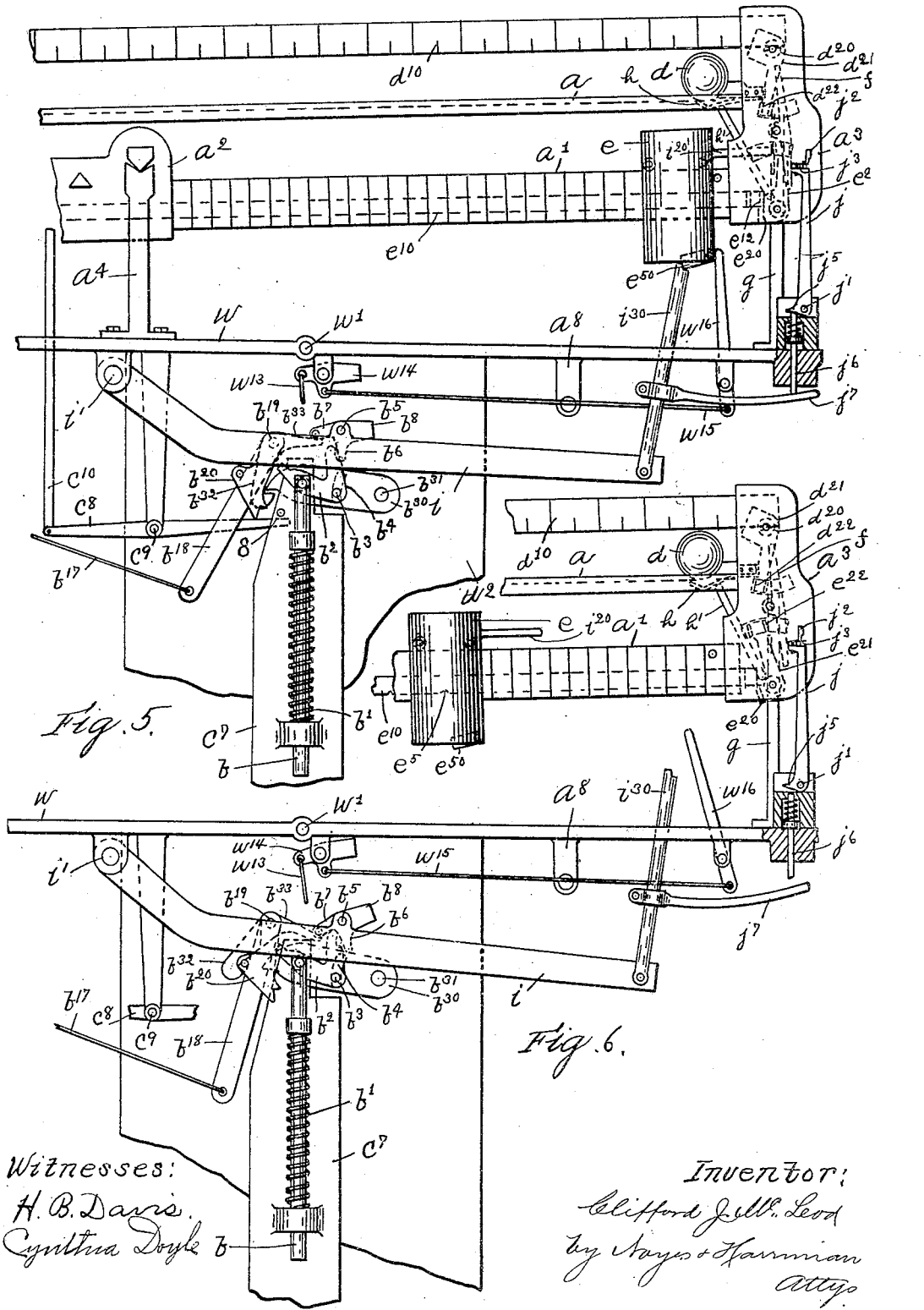

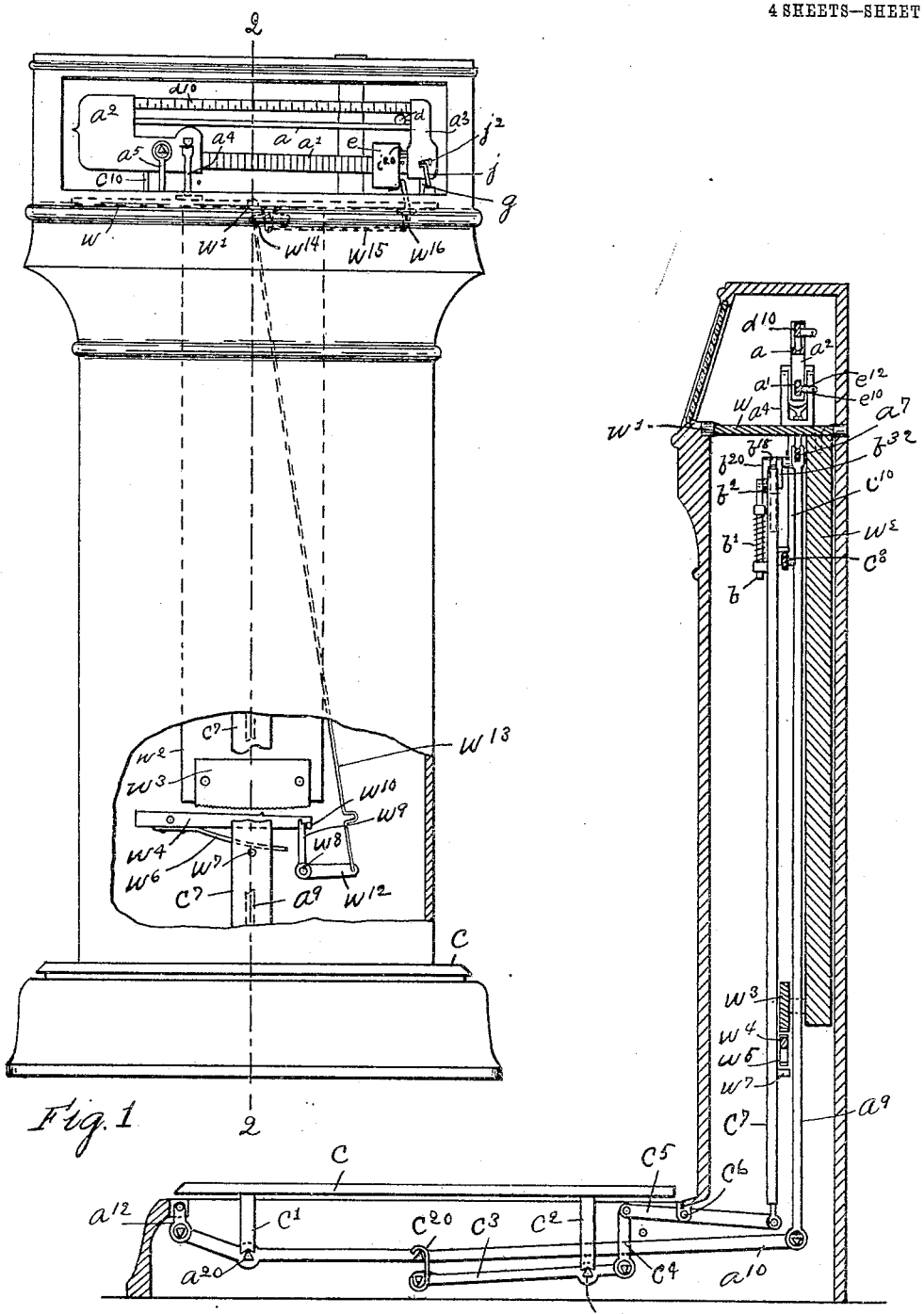

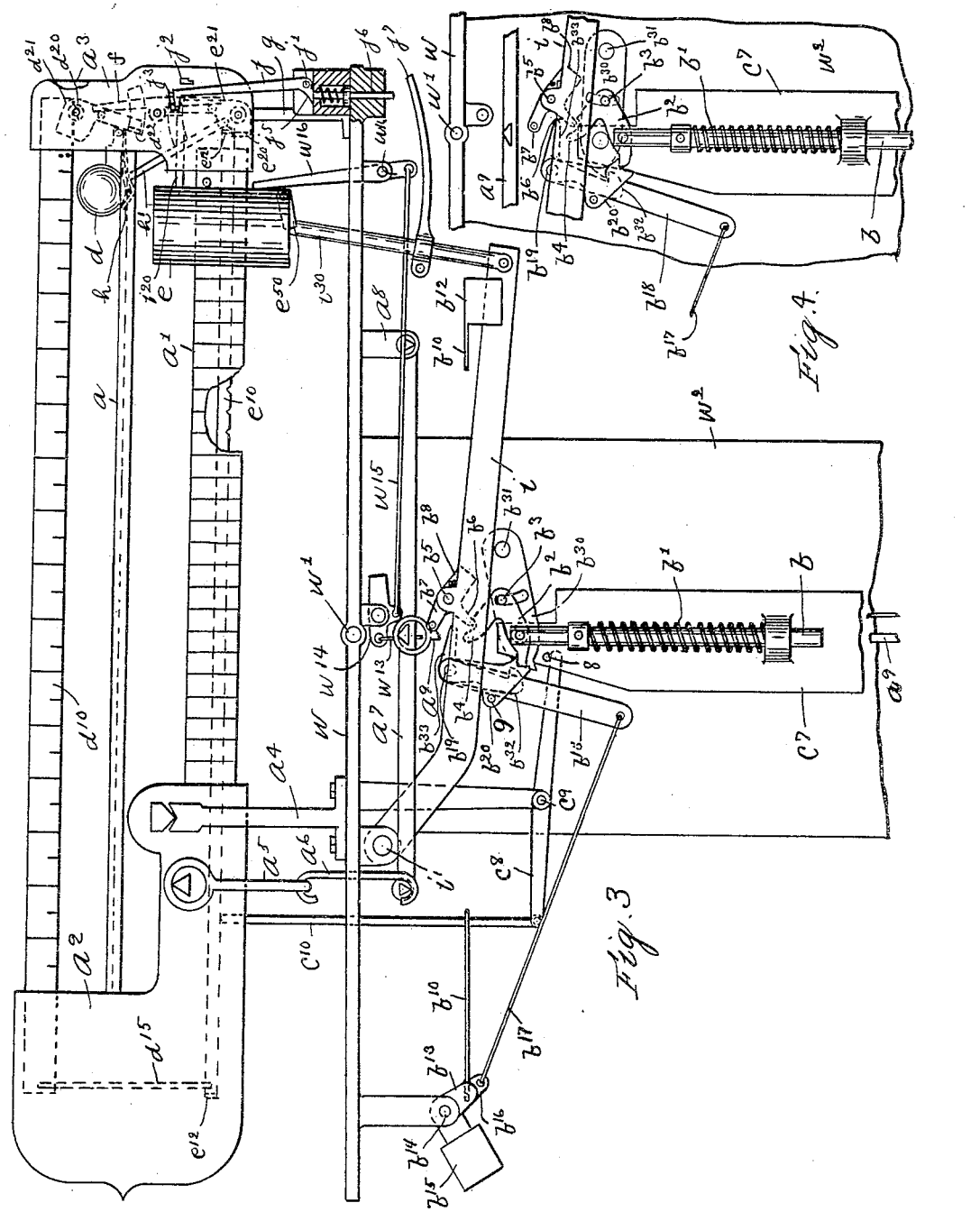

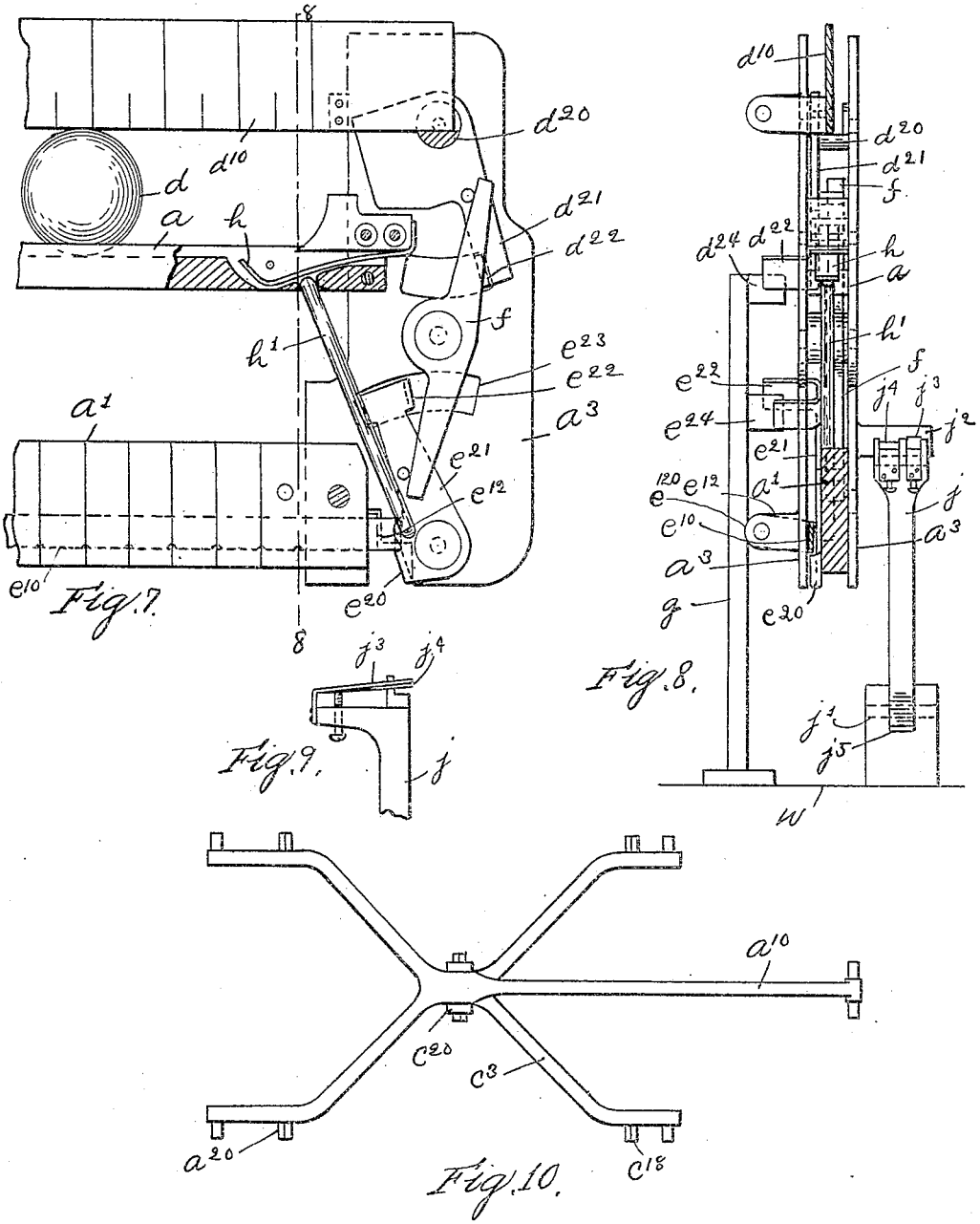

UNITED STATES PATENT OFFICE.

CLIFFORD J. McLEOD, OF HYDE PARK, MASSACHUSETTS, ASSIGNOR, BY MESNE ASSIGNMENTS, TO AUTOMATIC BEAM SCALE COMPANY, A CORPORATION OF MAINE.

COIN-CONTROLLED WEIGHING-MACHINE.

No. 930,876.     Specification of Letters Patent.     Patented Aug. 10, 1909.

Application filed November 9, 1906. Serial No. 342,632.

*To all whom it may concern:*

Be it known that I, CLIFFORD J. McLEOD, of Hyde Park, county of Norfolk, State of Massachusetts, have invented an Improvement in Coin-Controlled Weighing-Machines, of which the following description, in connection with the accompanying drawings, is a specification, like characters on the drawings representing like parts.

This invention relates to weighing machines and is intended as an improvement upon the weighing machine shown in my application for Letters Patent #297,098 filed January 22, 1906, and has for its object to improve the construction of the machine in several particulars; to provide for the employment of a spherical counterpoise which is adapted to run along on the scale beam to indicate the weight; and to provide a pivoted supporting frame for the scale beam having a balancing weight and a locking device for locking said frame in whatever position it may occupy when a person steps on the platform.

Figure 1 shows in front elevation a coin-controlled weighing-machine embodying this invention. Fig. 2 is a vertical section of the weighing-machine shown in Fig. 1, taken on the dotted line 2—2. Fig. 3 is an enlarged detail of the scale-beam in its normal position. Fig. 4 is a detail showing the parts of the coin-controlled mechanism in the positions they will occupy when a person steps on the platform, before he has deposited a coin. Fig. 5 is a view similar to Fig. 3, the parts being in the positions they will occupy when the person has stepped on the platform and has deposited a coin, the counterpoise, however, not being released. Fig. 6 is a view similar to Fig. 5 showing the parts in the positions they will occupy when the person is standing on the platform, obtaining his weight. Fig. 7 is an enlarged detail showing the controlling devices for the counterpoises, the beam being at a point of balance. Fig. 8 is a vertical section of the part shown in Fig. 7, taken on the dotted line 8—8. Fig. 9 is a detail of the prop for holding the scale-beam in elevated position. Fig. 10 is a plan view of the balancing-levers for the platform.

The scale-beam comprises two parallel bars $a$, $a'$, connected together at one end by a plate $a^2$ and at the opposite end by a pair of plates $a^3$, $a^3$. Counterpoises $d$ and $e$ are mounted respectively on said bars $a$, $a'$. A pivot-post $a^4$, supported by a frame-plate $w$ supports the scale-beam. The scale-beam normally declines toward one end, as for instance, toward its outer end, and the counterpoises normally occupy positions at the outer end of the scale-beam. The scale-beam is adapted to be moved on its pivot, to decline it toward its inner end, and thereby cause the counterpoises to move along thereon by gravity, to indicate the weight, and the scale-beam is afterward caused to resume its normal position, and the counterpoises thereby caused to again move thereon by gravity, and resume their normal positions. The counterpoise $e$ is made as a cylindrical block having a transverse hole through it for the bar $a'$, and the counterpoise $d$ is made as a ball, adapted to run in a groove formed in the upper edge of the bar $a$. The plate $a^2$ is connected by links $a^5$, $a^6$, with one end of a lever $a^7$, which is pivotally connected at its opposite end to a lug $a^8$ depending from the frame-plate $w$. The lever $a^7$ is connected at a point intermediate its length by a rod $a^9$, with one end of a balancing-lever $a^{10}$, which is horizontally disposed in the base of the machine. The lever $a^{10}$ is forked at one end, the ends of the arms thereof being pivotally connected by short links $a^{12}$ to the base. The platform $c$, made as usual, has two legs $c'$ extending downwardly, which engage lugs $a^{20}$ projecting laterally from the arms of the lever $a^{10}$, at points near the ends thereof; and also has two legs $c^2$ extending downwardly, which engage lugs $c^{18}$ projecting laterally from the arms of a forked lever $c^3$, at points near the ends thereof. The forked lever $c^3$ is also horizontally disposed in the base and is loosely connected at one end by a link $c^{20}$ with the lever $a^{10}$, and the outer ends of its arms are connected by links $c^4$ with the outer ends of the arms of a forked lever $c^5$, which is pivoted at $c^6$ to the base. The opposite end of the lever $c^5$ is connected to the lower end of a bar $c^7$, extending upwardly through the upright column of the machine.

When pressure is applied to the platform, as by a person stepping thereon, the rod $a^9$ will be drawn downward, tending to lift the scale-beam, and the bar $c^7$ will be moved upward, for the purpose of raising an actuating lever $i$, which is employed to positively raise the scale-beam to an elevated position, whereby the scale-beam bars are caused to decline toward their inner ends. The actuating lever $i$ is pivoted at $i'$ to the frame-plate $w$.

The bar $c^7$ has at its upper end an upright rod $b$, which is yieldingly supported by a spring $b'$, and upward movement of said bar acts to compress said spring to thereby raise the rod. This rod $b$ has pivotally connected to its upper end one arm $b^2$ of a bell-crank lever, which is pivoted at $b^3$ to a depending portion $w^2$ on the frame-plate $w$, and the other arm $b^4$ of said lever is notched at its end.

A weighted dog is pivoted at $b^5$ to an ear on the actuating lever $i$, being supported upon said lever, and said dog comprises the arms $b^6$, $b^7$ and $b^8$. The arm $b^8$ merely serves as a weight for controlling the movement of the dog. The arm $b^6$ engages the arm $b^4$, when the parts are in their normal positions, as shown in Fig. 3, and movement of said arm $b^4$ toward the right, caused by an upward movement of the rod $b$, moves said arm $b^6$ toward the right, and the two arms, acting as a toggle, operate to raise the actuating-lever $i$, and as soon as said arm $b^4$ has moved far enough for the arm $b^6$ to disengage it, as shown in Fig. 6, said actuating-lever $i$ is released and permitted to fall and thereby resume its normal position. The dog, however, remains in its abnormal position at the side of the arm $b^4$ until said arm is returned to its normal position, which it does when the bar $c^7$ descends, as for instance, when the person steps from the platform, and then said dog is caused to resume its normal position by the action of its weighted arm. Means are provided, adapted to be operated by a coin, for controlling the operation of said parts. $b^{10}$ represents a long arm having at its extremity a coin-receptacle $b^{12}$, and said arm is rigidly connected to a short arm $b^{13}$, pivoted at $b^{14}$, to a lug on the frame-plate $w$. A weighted arm $b^{15}$ is connected to the pivot-shaft $b^{14}$, which acts to return the arm $b^{10}$ to its normal position after it has been depressed by the weight of the coin. Another arm $b^{16}$ is secured to said pivot-shaft $b^{14}$, which is connected by a link $b^{17}$ with the lower end of an arm $b^{18}$, pivoted at $b^{19}$ to the depending portion $w^2$ of the frame-plate.

When a coin is placed in the coin-receptacle the arm $b^{10}$ is depressed, its weighted arm $b^{15}$ raised, and the arm $b^{18}$ moved in a direction toward the left. A locking-detent $b^{20}$, is located at one side of the arm $b^{18}$, which is pivoted at $b^{19}$, and said detent bears a pin 9 which rests against the arm $b^{18}$, so that said detent may be moved by said arm. This detent is arranged to engage the arm $b^2$, and acts to hold said arm against upward movement until moved out of engagement therewith by the arm $b^{18}$. Hence the weight of the coin operates the detent to release the arm $b^2$, permitting the arm $b^4$ to actuate the dog and raise the actuating lever. When a person steps on the platform before depositing a coin, the bar $c^7$ is raised, but the rod $b$ is held by the locking-detent $b^{20}$, hence the spring $b'$ will be compressed, storing up energy to lift the rod $b$ when the latter is released, and it is desirable, at such time, to lock the bar $c^7$ in its elevated position, so that if the person should step from the platform without depositing a coin, said bar will remain locked in its elevated position. This prevents unnecessary and undesirable movements of the bar $c^7$ and attached parts. To thus lock the bar $c^7$ an arm $b^{30}$, pivoted to the frame $w^2$ at $b^{31}$, is pivotally connected to the upper end of the bar $c^7$, being moved up and down on its pivot by said bar, and the end of said arm is adapted to engage a latch $b^{32}$, also mounted on the pivot pin $b^{19}$, when the bar is elevated, said latch thereby supporting the arm against downward movement, until removed from its engaging position, as shown in Fig. 4. The latch $b^{32}$ has an arm $b^{33}$ extended from it, which is adapted to be engaged by the arm $b^7$ of the dog, when said dog is turned on its pivot by the arm $b^4$, and when thus engaged, the latch will be moved out of engaging position and so held, as shown in Fig. 6, until the dog resumes its normal position. The actuating lever $i$ serves as and constitutes the main actuating lever for lifting the scale-beam to cause the counterpoises to move along on the scale-beam-bars by gravity to indicate the weight, and for performing other functions, as will be described. To lift the scale-beam an upright post $i^{30}$ is erected on the actuating lever $i$, at a point beneath the counterpoise $e$, when the latter is in its normal position, and when said lever is raised the counterpoise and scale-beam bearing it, will be raised. Thus a weight upon the platform acts through the balancing-levers and rod $a^9$ to exert a downward force upon the plate $a^2$, tending to lift the scale-beam on its pivot, as usual in platform scales, and such action is opposed by the counterpoises on the scale-beam; and also acts to raise the bar $c^7$ and lift the actuating lever $i$ to elevate the scale-beam, causing it to decline toward its inner end; and also acts to disengage said actuating lever from the scale-beam in order that said actuating lever may resume its normal position; and the operation of said parts is coin-controlled.

To hold the scale-beam in its elevated position, i. e., declining toward its inner end, when the actuating lever disengages it and resumes its normal position, see Fig. 6, in order that the counterpoises may slide along thereon, to indicate the weight, a prop is provided, which is located at or near the outer end of the scale-beam, and, which, as herein shown, consists of an upright post $j$, pivoted at its lower end at $j'$ to the frame-plate $w$, and having upon its upper end two flat springs $j^3, j^4$, arranged side by side, which are attached at one end only to the prop, the opposite ends thereof being free. The prop has a short arm $j^5$ extended from it, at its lower end, which overlies a vertically movable spring-pressed pin $j^6$ mounted in the frame-plate $w$, and extended therethrough, its lower end extending below the plate. An arm $j^7$ extends from the post $i^{30}$, which is adapted to engage and lift said pin $j^6$, to thereby move the prop $j$ on its pivot in a direction toward the right. The prop normally occupies a position at the left hand side of a stud $j^2$ on the scale-beam, being slightly removed therefrom, see Fig. 3, but when the actuating lever is operated and the scale beam elevated, the stud $j^2$ will be moved to a plane above the prop and the prop will be moved toward the right to a position beneath the stud so that as the actuating lever resumes its normal position said stud will be brought to bear upon the prop, engaging the springs thereon near their free ends. The scale-beam is thus held in elevated position by the prop, and the prop is held in its abnormal position by the weight of the scale-beam upon it. The spring $j^4$, see Figs. 8 and 9, is made heavier than the spring $j^3$, so as to exert a stronger pressure upon the stud $j^2$ than said spring $j^3$, and said lighter spring $j^3$ has a greater amplitude than the heavier spring $j^4$, so as to act after said heavier spring has spent its force. The scale-beam will remain in its elevated position until the prop is permitted to resume its normal position and thereby release it, whereupon the scale-beam is permitted to balance and subsequently to fall by gravity and resume its normal position, as soon as the weight upon the platform is removed. The prop is constructed to move by gravity and resume its normal position, when the pressure of the scale-beam upon it is relieved. This pressure gradually diminishes as the counterpoises move along on the scale-beam-bars toward the inner ends thereof or toward the point of balance, and will be sufficiently reduced to release the prop when the beam is balanced by the counterpoises. The springs $j^3, j^4$, however, act to further lift the scale-beam on the return movement of the prop, and said springs are purposely provided for accomplishing this result. Hence the prop not only serves to hold the scale-beam in elevated position but also serves as an actuating-device for further lifting the scale-beam, for purposes to be described.

It is designed that one of the counterpoises, as $e$, for instance, shall be locked at the outer end of the scale-beam-bar, and shall be automatically released when the scale-beam is raised by a weight on the platform, and shall then be free to slide along on the scale-beam-bar toward the inner end thereof, to indicate the weight, and shall be again locked at intermediate positions on said scale-beam-bar it may occupy when indicating the weight, and thereafter shall be again released and permitted to resume its normal position, when the weight is removed from the platform. It is also designed that the other counterpoise, as $d$, shall be locked at the other end of its scale-beam-bar, and shall be released after or as soon as the counterpoise $e$ is locked at an intermediate point on the bar, and shall then be free to roll along on the bar toward the inner end thereof, to indicate the weight, and shall be again locked, at intermediate positions on the bar it may occupy when indicating the weight, and thereafter shall be again released, simultaneously with the counterpoise $e$, and permitted to resume its normal position when the weight is removed from the platform. To lock the counterpoise $e$ at the outer end of the scale-beam-bar a gravitating latch $e^{50}$ is pivoted to the counterpoise, preferably at its lower end, which is adapted to engage the upper end of the upright post $i^{30}$, on the actuating lever $i$, when said scale-beam and lever occupy their normal positions, see Fig. 3, and to continue in engagement with said post while said lever is being raised by the platform to lift the scale-beam and move the prop into position to engage the elevated scale-beam, but to disengage said post when said lever returns to its normal position, see Fig. 6, leaving the scale-beam supported upon the prop. Thus the counterpoise $e$ is normally locked at the outer end of the scale-beam-bar when there is no weight on the platform, but when a person steps on the platform and causes the scale-beam to rise, said counterpoise $e$ will be released, and will be free to slide along on the scale-beam-bar to indicate the weight.

To lock the counterpoise $e$ in an intermediate position on the scale-beam-bar $a'$ when indicating the weight, a locking-bar $e^{10}$ is employed, consisting of a metallic strip extended lengthwise said scale-beam-bar, from end to end thereof or thereabout, having its ends $e^{12}$ bent at right angles to thereby form a bail-shaped device, and said locking bar is loosely or pivotally connected to the scale-beam by pins passing through the bent ends thereof and through lugs $e^{120}$ on the beam, so that it is freely movable up and down on its end supports. The locking-bar $e^{10}$ has notches formed along its lower edge at regular intervals which correspond in position with the graduations on the scale-beam-bar $a'$. The transverse hole through the counterpoise $e$, which receives the scale-beam-bar, is made large enough to also receive said locking-bar and to provide for the up and down movements thereof, and said counterpoise has a tooth $e^5$ in said hole, see dotted lines Fig. 6, which is adapted to enter any one of the notches in said locking-bar, when said bar is moved into engagement with it. The locking-bar is adapted to be raised and held in elevated position by means provided for the purpose and when released to fall by gravity and lock the counterpoise. The locking-bar is normally held in elevated position by an upright post $c^{10}$, on a lever $c^8$ pivoted at $c^9$ to the plate $w$, when there is no weight on the platform, as at such time said lever $c^8$ is held by a pin 8 on the bar $c^7$, but when a person steps on the platform said bar $c^7$ will be raised, carrying with it the pin 8, and the lever $c^8$ will then be permitted to fall by gravity and the locking-bar will be released. The locking-bar does not fall immediately, upon the withdrawal of the post $c^{10}$, as other means are provided for holding it in elevated position and also for controlling its operation.

At the outer end of the scale-beam a controlling-device is provided for controlling the operation of the locking-bar $e^{10}$ upon the withdrawal of the post $c^{10}$, which, is herein shown, as a detent-lever adapted to coöperate with a fixed detent with respect to which it is movable. The detent-lever, as herein shown, for the purpose of illustration, is made as a bell-crank lever, and is placed between the two plates $a^3$, $a^3$, and is pivoted thereto, thus being supported upon and carried by the scale-beam. The detent-lever has an arm $e^{20}$, which extends beneath one end of the locking-bar $e^{10}$, and an arm $e^{21}$, which bears a detent $e^{22}$, which extends laterally and projects through a hole $e^{23}$ in one of the plates $a^3$. The fixed detent $e^{24}$, with which said detent-lever coöperates, is arranged or formed on an upright post $g$, erected upon the frame-plate $w$, and located close to the outer end of the scale-beam. The scale-beam moves up and down with respect to said post, hence the detent-lever moves up and down with respect to the fixed detent $e^{24}$. The detent-lever is moved to what may be termed its normal position of rest by the counterpoise $e$, when the latter resumes its normal position at the outer end of the scale-beam-bar, and to accomplish this result said counterpoise $e$ has on it a pin $i^{20}$, which engages the arm $e^{21}$ and moves the detent-lever on its pivot, and when so moved the arm $e^{20}$ will occupy a position beneath the elevated locking-bar, so as to support said bar when the post $c^{10}$ is withdrawn, and the detent $e^{22}$ will occupy a position at the right hand side of but below the fixed detent $e^{24}$, so that when the scale-beam is elevated by the actuating lever said detent $e^{22}$ will be moved into engagement with the right hand side of the detent $e^{24}$ and the detent-lever thereby held.

As the counterpoise $e$ moves along on the scale-beam, toward the inner end thereof, to indicate the weight, the pressure of the scale-beam on the prop $j$ gradually diminishes and the springs act to lift the scale-beam farther, and when said counterpoise arrives at a point on the bar to indicate the correct weight the scale-beam has been thus lifted far enough for the detent $e^{22}$ to pass over the detent $e^{24}$, and the detent-lever being thus released, the locking-bar $e^{10}$ immediately falls by gravity and engages the counterpoise. If one of the notches on said locking-bar is at such time opposite the tooth on the counterpoise said tooth will enter the notch and the counterpoise will become locked but otherwise the counterpoise will continue to slide along on the bar, notwithstanding the locking-bar is in engagement with it, until its tooth enters the next notch. In order that the prop may act to further lift the scale-beam the springs are adjusted to exert a force sufficient to lift the scale-beam with the counterpoise $d$ at the outer end thereof, when the counterpoise $e$ is at a point on the bar to indicate the correct weight, and when the scale-beam has been lifted sufficiently by said springs for the detent $e^{22}$ to pass over the detent $c^{24}$, one of said springs will have spent its force. Thus, if the weight on the platform is 156 pounds, then the counterpoise $e$ will slide along on the bar until it arrives in a position thereon to indicate 156 pounds, but as the bar has ten-pound graduation marks and the locking-bar is correspondingly notched, it will not be locked until it arrives at 150 pounds. When the counterpoise $e$ arrived at the point to correctly indicate 156 pounds, the scale-beam would have been balanced were it not for the counterpoise $d$ which is at the outer end of the scale-beam, hence the springs on the prop must exert a force sufficient to lift the scale-beam with the counterpoise $d$ at the outer end thereof, just at this time, in order to further lift the scale-beam so as to release the locking-bar. The counterpoise $e$, which has thus been locked at an intermediate point on the scale-beam-bar will remain locked until the counterpoise $d$ has been moved along on the scale-beam-bar and has been similarly locked.

The counterpoise $d$, like the counterpoise $e$, normally occupies a position at the outer end of the scale-beam-bar and it is normally locked in such position. To thus lock the counterpoise $d$ a spring-finger $h$ is attached to the scale-beam, which occupies a position in a recess formed in the scale-beam-bar, at the outer end thereof, and when lifted will engage the counterpoise $d$ and hold it. The normal action of the spring-finger $h$, however, is to release the counterpoise, and hence means are provided for moving it into engagement with the counterpoise, and for this purpose a rod $h'$ is loosely connected at its lower end to the arm $e^{20}$ of the detent-lever, its upper end passing through a hole in the bar $a$, below the spring-finger and when said detent-lever is turned on its pivot by the counterpoise $e$, when resuming its normal position, the rod $h'$ will be moved longitudinally and the spring-finger $h$ lifted. As the locking-means for the counterpoise $d$ is thus controlled by the detent-lever $e^{20}$, $e^{21}$, it will be seen that as soon as said lever is released by its detent passing over the top of the fixed detent $e^{24}$, said rod $h'$ will be drawn downward and the spring-finger permitted to move and release the counterpoise $d$, and such operation takes place as soon as the counterpoise $e$ has become locked at an intermediate point on the scale-beam-bar to indicate the weight. The counterpoise $d$, therefore, is released and begins to roll along on the scale-beam-bar just as soon as the counterpoise $e$ becomes locked. The counterpoise $d$ is locked on the scale-beam-bar $a$, at any intermediate point which it may occupy when indicating the weight, by means of a locking-bar $d^{10}$, which is herein shown as a bail-shaped bar pivotally supported at its ends upon the scale-beam, and normally held elevated by a post $d^{15}$, which is erected upon the locking-bar $e^{10}$, and also supported at its outer end by a suitable controlling-device, as will be described, and said bar is arranged above the counterpoise $d$ and is adapted to frictionally engage and thereby hold it, when permitted to act. When the locking-bar $e^{10}$ falls by gravity and locks the counterpoise $e$, the post $d^{15}$ will be withdrawn from locking-bar $d^{10}$, but said locking-bar will still be supported by the controlling-device. The controlling-device for the locking-bar $d^{10}$ is located at the outer end of the scale-beam-bar, and consists of a detent-lever which is pivotally supported between the plates $a^3$, $a^3$, of the scale-beam, and has a cam $d^{20}$ which occupies a position beneath the outer end of the locking-bar $d^{10}$ and is adapted to support it, and also has an arm $d^{21}$ which bears a detent $d^{22}$ at its extremity which projects through a hole in one of the plates $a^3$ and is adapted to coöperate with a fixed detent $d^{24}$ on the stationary post $g$, said fixed detent being located a short distance above the fixed detent $e^{24}$.

The detent-carrying arm $d^{21}$ normally occupies a position at the left hand side of but below the detent $d^{24}$ and is held in such position by a lever $f$, pivoted at a point intermediate its length, the upper end of which bears upon the detent-carrying arm $d^{21}$ and the lower end upon the detent-carrying arm $e^{21}$. Said detent-carrying arm $d^{21}$ is moved into engagement with the fixed detent $d^{24}$ when the scale-beam is lifted and is held from turning by said fixed detent when the arm $e^{21}$ passes over the top of the detent $e^{24}$ and releases the lever $f$, thereby continuing to hold the locking-bar $d^{10}$ in its elevated position. As the counterpoise $d$ moves along on its scale-beam-bar to indicate the weight the pressure of the scale-beam upon the prop $j$ is gradually further diminished and the scale-beam is consequently gradually further lifted by the remaining spring on the prop until the counterpoise arrives at a point on the scale-beam-bar to indicate the weight, or in other words, until it has arrived in position to balance the beam, if the beam was not held in elevated position by the prop. By this time, the pressure of the scale-beam on the prop has been reduced to the weight of the beam itself, and the spring on the prop will act to further lift the scale-beam and such further upward movement is sufficient for the detent $d^{22}$ to pass over and thereby disengage the fixed detent $d^{24}$, whereupon the locking-bar $d^{10}$ is immediately released and permitted to fall by gravity, and lock the counterpoise $d$ at any point on the scale-beam it may occupy at such time. Assuming the weight to be 156 pounds on the platform, as in the example above stated, and the counterpoise $e$ locked at 150 pounds, the counterpoise $d$ will roll along on the scale-beam-bar until it arrives at the 6-pound mark, and will then become locked. Both counterpoises $e$ and $d$ having been locked on the scale-beam-bars by the gravitating locking-bars $e^{10}$ and $d^{10}$, will remain locked thereon until said locking-bars are raised to release them. As soon as the spring on the prop has operated to lift the scale-beam high enough for the detent-lever to release the locking-bar $d^{10}$, the pressure of the scale beam on the prop is relieved, whereupon said prop will resume its normal position, moving to the left hand side of the stud $j^2$, by gravity, thereby disengaging the scale-beam, and permitting it to resume a balanced position. Assuming that the weight still remains on the platform, the counterpoises will still remain locked at intermediate points on the scale-beam-bars and the scale-beam will still occupy a balanced position, but as soon as the weight is removed from the platform the scale-beam will resume its normal position, declining toward its outer end, and the upright post $c^{10}$ will lift the locking-bar $e^{10}$, and the upright post $d^{15}$, which is attached thereto will lift the locking-bar $d^{10}$, thereby simultaneously releasing the two counterpoises $e$ and $d$, permitting them to move along on the scale-beam-bars until they arrive at the extreme outer ends thereof, when the lower counterpoise $e$ will become locked by the gravitating latch engaging the upper end of the post $i^{30}$, and the detent-carrying arm $e^{21}$ will be engaged by the pin on the counterpoise $e$, and the detent-lever thereby caused to resume its normal position, and the locking-device of the counterpoise $d$ will be set to lock said counterpoise at the outer end of the scale-beam, and the lever $f$ will be operated by the detent-carrying arm $e^{21}$ to restore the detent-lever $d^{21}$. The two automatically operated counterpoises are, therefore, released successively, first one and then the other moving along on the scale-beam-bar toward the inner end thereof to indicate the weight, becoming locked when the scale-beam balances, and thereafter both counterpoises are simultaneously released and permitted to resume their normal positions at the outer end of the scale-beam. The springs $j^3$ and $j^4$ on the prop are adjusted by suitable adjusting screws, see Fig. 9, provided for the purpose whereby they will exert the required force to lift the scale-beam to release the locking-devices at the required moments, and the moments of the release of the locking-devices may be varied by adjusting the springs by said adjusting screws.

The frame-plate $w$ is horizontally disposed in the head of the machine and is pivotally supported at a point intermediate its length, as at $w'$, and said plate is made self-adjusting so that it will always occupy a horizontal position regardless of the position of the base. To accomplish this result a balancing-weight $w^2$ is rigidly secured to the frame-plate, at the intermediate portion thereof, which extends downward a considerable distance so as to bring the center of gravity of the plate below its point of support, and said balancing-weight thereby acts to hold the frame-plate in a state of stable equilibrium. A locking-device is provided for locking the frame-plate in whatever position it may occupy when a person steps on the platform and for holding it locked until the person steps from the platform, and the counterpoise $e$ resumes its normal position. The balancing-weight $w^2$ has at its lower end a plate $w^3$, provided with a serrated edge, below which a pivoted lever $w^4$ is located, bearing a tooth, which is adapted to engage said serrated plate when said lever is raised. The lever $w^4$ has secured to it a flat spring $w^6$ which rests upon a pin $w^7$ projecting from the bar $c^7$, and when said bar is raised said lever $w^4$ is moved into engagement with the serrated plate to lock the frame-plate $w$. Therefore, when a person steps upon the platform and causes the bar $c^7$ to rise, the frame-plate will be locked. A bell-crank lever is pivoted at $w^8$ beneath the lever $w^4$, one arm, as $w^9$, of which serves as a prop to engage a lug $w^{10}$ on said lever $w^4$, when said lever is elevated, and the other arm, as $w^{12}$, of which is connected by a link $w^{13}$ with one arm of a bell-crank lever $w^{14}$ pivoted to a lug on the frame-plate, the other arm of said bell-crank lever $w^{14}$ being connected by a link $w^{15}$ with the lower end of a lever $w^{16}$, pivoted to a lug on said frame-plate $w$, the upper end of which extends into the path of return movement of the counterpoise $e$, to be engaged and moved by said counterpoise when it resumes its normal position, to thereby disengage the prop from the lever $w^4$, permitting it to disengage the serrated plate. Thus the frame-plate will remain locked until the counterpoise $e$ has resumed its normal position.

I do not desire to limit my invention to the particular means herein shown for carrying out the same, as it is obvious that the construction and arrangement of many of the parts may be varied without departing from its spirit and scope.

Having thus described my invention, what I claim as new and desire to secure by Letters Patent is:—

1. In a weighing machine, a pivoted scale-beam, normally declining toward its outer end, an automatically operated counterpoise thereon, a pivot-post for said scale-beam, a plate on which said post is erected, an actuating-lever pivoted to said plate for lifting the scale-beam to an elevated position to enable the counterpoise to move along on the scale-beam to indicate the weight, and means, connected with the platform, for operating said actuating-lever, substantially as described.

2. In a weighing machine, a pivoted scale-beam, normally declining toward its outer end, an automatically operated counterpoise thereon, a pivot-post for said scale-beam, a pivotally supported plate on which said post is erected, an actuating-lever, pivoted to said plate, for lifting the scale-beam to an elevated position, to enable the counterpoise to move along on the scale-beam to indicate the weight, and means, connected with the platform, for operating said actuating-lever, substantially as described.

3. In a weighing machine, a pivoted scale-beam, normally declining toward its outer end, an automatically operated counterpoise thereon, an actuating-lever for lifting the scale-beam to an elevated position, a rod connected with the platform and a toggle-connection between said rod and said actuating-lever, whereby the actuating-lever is operated by the platform, substantially as described.

4. In a weighing machine, a pivoted scale-beam, normally declining toward its outer end, an automatically operated counterpoise thereon, an actuating-lever for lifting the scale-beam to an elevated position, a rod connected with the platform, a pivoted bell-crank lever connected with said rod and a weighted dog connected with said actuating-lever, which is engaged by said bell-crank lever, substantially as described.

5. In a weighing machine, a pivoted scale-beam, normally declining toward its outer end, an automatically operated counterpoise thereon, an actuating-lever for lifting the scale-beam to an elevated position, a rod connected with the platform, a separable toggle-connection between said rod and said actuating-lever, whereby the actuating-lever is raised by the platform and thereafter permitted to resume its normal position independently of the platform, substantially as described.

6. In a weighing machine, a pivoted scale-beam, normally declining toward its outer end, an automatically operated counterpoise thereon, an actuating-lever for lifting the scale-beam to an elevated position, a rod connected with the platform and a toggle-connection between said rod and said actuating-lever, whereby the actuating-lever is operated by the platform, a locking-detent engaging one member of said toggle-connection and means for operating it, substantially as described.

7. In a weighing-machine, a pivoted scale-beam normally declining toward its outer end, an automatically operated counterpoise thereon, an actuating lever for lifting the scale-beam to an elevated position, a rod connected with the platform, a separable toggle connection, one member of which is connected with said rod and the other member with said lever, a locking-detent engaging the member which is connected with said rod, and means for operating it, substantially as described.

8. In a weighing machine, a pivoted scale-beam, normally declining toward its outer end, an automatically operated counterpoise thereon, an actuating-lever for lifting the scale-beam to an elevated position, a rod connected with the platform, a yielding member connected with said rod and means connecting said yielding member with said actuating-lever, substantially as described.

9. In a weighing machine, a pivoted scale-beam, normally declining toward its outer end, an automatically operated counterpoise thereon, an actuating-lever for lifting the scale-beam to an elevated position, a rod connected with the platform, a yielding member connected with said rod, means connecting said yielding member with said actuating-lever and means for locking said rod in its elevated position with the yielding member compressed, substantially as described.

10. In a weighing machine, a pivoted scale-beam, normally declining toward its outer end, an automatically operated counterpoise thereon, an actuating-lever for lifting the scale-beam to an elevated position, a rod connected with the platform, a yielding member connected with said rod and the said actuating-lever, means for locking said rod in its elevated position with the yielding member compressed, and means, operated by said yielding member when operating the actuating-lever, for moving said locking means out of its engaging position, substantially as described.

11. In a weighing machine, a pivoted scale-beam, normally declining toward its outer end, an automatically operated counterpoise thereon, an actuating-lever for lifting the scale-beam to an elevated position, a rod connected with the platform, a yielding member connected with said rod, means connecting said yielding member with said actuating-lever, a locking-detent for said yielding member, means for releasing it, a locking-device for said rod for holding it in its elevated position with the yielding member compressed and means for moving said locking-device out of its engaging position, substantially as described.

12. In a weighing-machine, a pivoted scale-beam normally declining toward its outer end, an automatically operated counterpoise thereon, an actuating lever for lifting the scale-beam to an elevated position, a rod connected with the platform, a spring-pressed bar borne by said rod, a separable toggle connection, one member of which is connected with said bar and the other member with the actuating lever, a locking-device for locking the toggle connection in its normal position, a locking-device for locking the bar in its elevated position with the spring on said bar compressed, and means for releasing said last named locking-device, substantially as described.

13. In a weighing machine, a pivoted scale-beam normally declining toward its outer end, an automatically operated counterpoise thereon, an actuating-lever, operated by the platform, for lifting the scale-beam to enable the counterpoise to move along thereon to indicate the weight, a prop for holding the scale-beam in its elevated position having a projection, a spring-pressed pin over which the projection on said prop extends, and an arm on said actuating-lever for lifting said pin to move the prop into position to engage the elevated scale-beam, substantially as described.

14. In a weighing-machine, a pivoted scale-beam, a counterpoise normally occupying a position at the outer end thereof, means for lifting the scale-beam to cause the counterpoise to move along thereon toward the inner end thereof by gravity to indicate the weight, a prop having a spring for holding the scale-beam in elevated position while the counterpoise moves along thereon and for lifting it as the pressure thereupon diminishes, and means for locking the counterpoise at intermediate positions on the scale-beam, substantially as described.

15. In a weighing-machine, a pivoted scale-beam, an automatically operated counterpoise thereon, a locking-device adapted to engage the counterpoise at intermediate positions on the scale-beam, means operated by a movement of the scale-beam for controlling the operation of said locking-device, and a prop for holding the scale-beam in elevated position, declining toward its inner end, said prop having a spring for lifting the scale-beam as the pressure thereupon is diminished, substantially as described.

16. In a weighing-machine, a pivoted scale-beam, an automatically operated counterpoise thereon, a locking-device adapted to engage the counterpoise at intermediate positions on the scale-beam, means operated by a movement of the scale beam for controlling the operation of said locking-device, a prop for holding the scale-beam in elevated position, declining toward its inner end, said prop having a spring for lifting the scale-beam as the pressure thereupon is diminished, and means for adjusting said spring to vary the moment of release of the locking-device, substantially as described.

17. In a weighing-machine, a pivoted scale-beam, an automatically operated counterpoise thereon, a locking-device adapted to engage the counterpoise at intermediate positions on the scale-beam, means operated by a movement of the scale-beam for controlling the operation of said locking-device, a prop for holding the scale-beam in elevated position, declining toward its inner end, said prop having a spring for lifting the scale-beam as the pressure thereupon is diminished, and means for placing the scale-beam under the influence of said spring, substantially as described.

18. In a weighing machine, a pivoted scale-beam, an automatically operated counterpoise thereon, a locking-device adapted to engage the counterpoise at intermediate positions on the scale-beam, means operated by a movement of the scale-beam for controlling the operation of said locking-device, a prop for holding the scale-beam in elevated position, declining toward its inner end, said prop having a spring for lifting the scale-beam as the pressure thereupon is diminished, and means for lifting the scale-beam into position to be engaged by said prop, substantially as described.

19. In a weighing-machine, a pivoted scale-beam, an automatically operated counterpoise thereon, a locking-device adapted to engage the counterpoise at intermediate positions on the scale-beam, means operated by a movement of the scale-beam for controlling the operation of said locking device, a prop for holding the scale-beam in elevated position, declining toward its inner end, said prop having a spring for lifting the scale-beam as the pressure thereupon is diminished to control the operation of the locking-device and to disengage the scale-beam from the prop, and means for moving the scale-beam and prop into engagement with each other, substantially as described.

20. In a weighing machine, a pivoted scale-beam, an automatically operated counterpoise thereon, a locking-device adapted to engage the counterpoise at intermediate positions on the scale-beam, means operated by a movement of the scale-beam for controlling the operation of said locking-device, a prop for holding the scale-beam in elevated position, declining toward its inner end, said prop having a spring for lifting the scale-beam as the pressure thereupon is diminished and being movable from beneath the beam when the counterpoise arrives at the position to indicate the weight to permit the beam to balance, and means for lifting the scale-beam into position to be engaged by said prop, substantially as described.

21. In a weighing machine, a pivoted scale-beam, an automatically operated counterpoise thereon, a locking-device adapted to engage the counterpoise in any intermediate position on the scale-beam, a controlling-device for said locking-device, borne by the scale-beam, a fixed member with which said controlling-device coöperates, a prop for holding the scale-beam in elevated position with the controlling-device in engagement with said fixed member, said prop having a spring for lifting the scale-beam when the pressure thereupon is diminished to thereby disengage said controlling-device from the fixed member and permit the locking-device to operate, substantially as described.

22. In a weighing-machine, a pivoted scale-beam, two automatically operated counterpoises thereon, a locking-device for each counterpoise, adapted to engage the counterpoise at intermediate positions on the scale-beam, means controlled by the position of the scale-beam for successively releasing said locking-devices, a prop for holding the scale-beam elevated, having two springs for lifting the scale-beam as the pressure thereupon is diminished, to thereby successively control the release of the locking-devices, substantially as described.

23. In a weighing-machine, a pivoted scale-beam, two automatically operated counterpoises thereon, a locking-device for each counterpoise, adapted to engage the counterpoise at intermediate positions on the scale-beam, means controlled by the position of the scale-beam for successively releasing said locking-devices, a prop for holding the scale-beam elevated, having two springs for lifting the scale-beam as the pressure thereupon is diminished, to thereby successively control the release of the locking-devices, and means for lifting the scale-beam into position to be engaged by the springs on said prop, substantially as described.

24. In a weighing-machine, a pivoted scale-beam, two automatically operated counterpoises thereon, a locking-device for each counterpoise, adapted to engage the counterpoise at intermediate positions on the scale-beam, means controlled by the position of the scale-beam for successively releasing said locking-devices, a prop for holding the scale-beam elevated, having two springs for lifting the scale-beam as the pressure thereupon is diminished, to thereby successively control the release of the locking-devices and permit the prop to disengage the scale-beam, and means for moving the scale-beam and prop into engagement with each other, substantially as described.

25. In a weighing-machine, a pivoted scale-beam, two automatically operated counterpoises thereon, a locking-device for each counterpoise, adapted to engage the counterpoise at intermediate positions on the scale-beam, means controlled by the position of the scale-beam for successively releasing said locking-devices, a prop for holding the scale-beam elevated, having thereon a heavy spring and also a light spring of greater amplitude than the heavy spring, said springs acting conjunctively to lift the scale-beam as the pressure thereupon is diminished to release one of said locking-devices and said light spring subsequently acting to further lift the scale-beam to release the other locking-device, and means for lifting the scale-beam to place it under the influence of said springs, substantially as described.

26. In a weighing-machine, the combination of a pivoted scale-beam, two automatically operated counterpoises thereon, a locking-device for each counterpoise adapted to lock the counterpoises at intermediate positions on the scale-beam, means for holding said locking-devices in their unlocking positions, means controlled by the scale-beam for successively releasing said locking-devices, and adjustable means for moving said scale-beam to release said locking-devices and to independently vary the moment of their release, substantially as described.

27. In a weighing-machine, a pivoted scale-beam, an automatically operated counterpoise thereon, a locking-device adapted to engage the counterpoise at intermediate positions on the scale-beam, a detent-lever borne by the scale-beam for controlling the operation of said locking-device, and a fixed detent with which it coöperates, whereby the operation of said locking-device is governed by the position of the scale-beam, and means operated by the counterpoise when resuming its normal position for restoring said detent-lever, substantially as described.

28. In a weighing-machine, a pivoted scale-beam, an automatically operated counterpoise thereon, a locking-device adapted to engage the counterpoise at intermediate positions on the scale-beam, a detent-lever borne by the scale-beam for controlling the operation of said locking-device, and a fixed detent with which it coöperates, whereby the operation of said locking-device is governed by the position of the scale-beam, a prop for holding the scale-beam elevated, having thereon a spring for lifting the scale-beam to move the detent-lever with respect to the fixed detent, to thereby release said detent-lever when the pressure on the spring has been reduced, and means, operated by the counterpoise when resuming its normal position, for restoring said detent-lever, substantially as described.

29. In a weighing machine, the combination of a pivoted scale-beam, an automatically operated spherical counterpoise thereon, a locking-device for frictionally engaging and holding said counterpoise at any intermediate position on the scale-beam it may occupy when indicating the weight, means for holding said locking-device in inoperative position and subsequently releasing it, substantially as described.

30. In a weighing machine, the combination of a pivoted scale-beam, an automatically operated spherical counterpoise thereon, a locking-device for frictionally engaging and holding said counterpoise in any intermediate position on the scale-beam to indicate the weight, means for holding said locking-device in inoperative position and subsequently releasing it, a locking-device for locking said counterpoise at one end of the scale-beam, and means for operating said locking-device to release the counterpoise, substantially as described.

31. In a weighing machine, the combination of a pivoted scale-beam having a grooved bar, a spherical counterpoise, normally occupying a position at one end of said grooved bar, means for lifting the beam to cause the counterpoise to roll along on said bar by gravity to indicate the weight, and means for frictionally engaging and holding said spherical counterpoise in any intermediate position on said bar it may occupy when indicating the weight, substantially as described.

32. In a weighing machine, the combination of a pivoted scale-beam having a grooved bar, a spherical counterpoise, normally occupying a position at one end of said grooved bar, means for lifting the beam to cause the counterpoise to roll along on said bar by gravity to indicate the weight, means for frictionally engaging and holding said spherical counterpoise in any intermediate position on said bar it may occupy when indicating the weight, a locking-device for locking said spherical counterpoise at one end of the bar, and means for operating said locking-device to release said counterpoise, substantially as described.

33. In a weighing machine, a pivoted scale-beam having a grooved bar, a spherical counterpoise adapted to roll along on said bar to indicate the weight, and a graduated bar extending lengthwise the scale-beam which is movable into engagement with said spherical counterpoise to hold it in any intermediate position it may occupy when indicating the weight, substantially as described.

34. In a weighing machine, a pivoted scale-beam having a grooved bar, a spherical counterpoise adapted to roll along on said bar by gravity to indicate the weight, a graduated bar extending lengthwise the scale-beam, which is movable into engagement with said spherical counterpoise to hold it in any intermediate position it may occupy when indicating the weight, and means for holding said graduated bar in elevated position and for releasing it permitting it to fall by gravity when the scale-beam balances, substantially as described.

35. In a weighing machine, a pivoted scale-beam having a grooved bar, a spherical counterpoise movable in the groove in said bar to indicate the weight, and a locking-device adapted to project into and recede from the groove at the outer end of said bar to lock and subsequently release the counterpoise, substantially as described.

36. In a weighing machine, a pivoted scale-beam having a grooved bar, a spherical counterpoise movable on said bar to indicate the weight, a spring-finger at the outer end of said bar, and means for projecting it into the groove thereof to lock the counterpoise, substantially as described.

37. In a weighing machine, a pivoted scale-beam, two automatically operated counterpoises thereon, a locking-device for locking one of said counterpoises at the outer end of the beam, and means operated by the other counterpoise, when resuming its normal position at the outer end of the beam, for operating said locking-device to lock said counterpoise, substantially as described.

38. In a weighing machine, a pivoted scale-beam, two automatically operated counterpoises thereon, a locking-device for locking one of said counterpoises at the outer end of the beam, and means operated by the other counterpoise, when resuming its normal position at the outer end of the beam, for operating said locking-device to lock said counterpoise, and means controlled by the position of the scale-beam for releasing said locking-device, substantially as described.

39. In a weighing machine, a pivoted scale-beam, two automatically operated counterpoises thereon, a locking-device adapted to engage one of said counterpoises in any intermediate position on the scale-beam, a controlling-device for said locking-device, the operation of which is governed by the position of the scale-beam, means, operated by said counterpoise when resuming its normal position at the outer end of the scale-beam, for restoring said controlling-device, a locking-device for locking the other counterpoise at the outer end of the scale-beam, and means, connected with said controlling-device for controlling the operation of said locking-device, whereby the last named counterpoise is released when the first named counterpoise is locked in an intermediate position, and is locked at the outer end of the beam when said first named counterpoise resumes its normal position, substantially as described.

40. In a weighing machine, a pivoted scale-beam, two automatically operated counterpoises thereon, a locking-device for each counterpoise, for locking it at an intermediate position on the scale-beam, a controlling-device for each locking-device, means for operating said controlling-devices to successively operate the locking-devices to lock the counterpoises, means for operating said locking-devices to release the counterpoises, and means, operated by one of the counterpoises when resuming its normal position at the outer end of the beam, for returning said controlling-devices to their normal positions, substantially as described.

41. In a weighing machine, a pivoted scale-beam having a grooved bar extending in the direction of its length, a spherical counterpoise movable along in the groove in said bar to indicate the weight, and a locking-bar located above said counterpoise and extending lengthwise the beam which is movable into frictional engagement with said counterpoise to lock it at any intermediate point on the bar, substantially as described.

42. In a weighing-machine, a pivoted scale-beam having a grooved bar extending in the direction of its length, a spherical counterpoise movable along in the groove in said bar to indicate the weight, a graduated locking-bar extended lengthwise the beam above said counterpoise and movable into frictional engagement with said counterpoise to lock it at any intermediate point on the bar, substantially as described.

43. In a weighing machine, a pivoted scale-beam, an automatically operated counterpoise thereon, a pivoted frame-plate bearing said beam, a balancing-weight connected with said frame-plate, a locking-device for said frame-plate, and means for operating it, substantially as described.

44. In a weighing machine, a pivoted scale-beam, an automatically operated counterpoise thereon, a pivoted frame-plate bearing said scale-beam, a balancing-weight connected with said frame-plate, a locking-device for said frame-plate, and means, operated by the platform, for operating said locking-device to lock the frame-plate in whatever position it may occupy when the platform is depressed, substantially as described.

45. In a weighing machine, a pivoted scale-beam, an automatically operated counterpoise thereon, a pivoted frame-plate bearing said beam, a balancing-weight connected with said frame-plate, a locking-device for said frame-plate, and means for operating it, and means, operated by the counterpoise when resuming its normal position at the outer end of the beam, for releasing said locking-device, substantially as described.

46. In a weighing-machine, the combination with a pivoted scale-beam, a rolling counterpoise thereon, a movable bar for engaging said counterpoise in any intermediate position it may occupy on the scale-beam when indicating the weight, and means for automatically releasing said bar permitting it to engage and thereby lock the counterpoise, substantially as described.

47. In a weighing-machine, the combination with a pivoted scale-beam, a rolling counterpoise thereon, a movable graduated bar for engaging said counterpoise in any intermediate position it may occupy on the scale-beam when indicating the weight, and means for automatically releasing said bar permitting it to engage and thereby lock the counterpoise, substantially as described.

48. In a weighing-machine, the combination with a pivoted scale-beam, a rolling counterpoise thereon, a movable bar for frictionally engaging said counterpoise in any intermediate position it may occupy on the scale-beam when indicating the weight, and means for automatically releasing said bar to frictionally engage and thereby lock the counterpoise, substantially as described.

49. In a weighing-machine, the combination with a pivoted scale-beam, a spherical counterpoise thereon, a movable bar for frictionally engaging said counterpoise in any intermediate position it may occupy on the scale-beam when indicating the weight, and means for automatically releasing said bar permitting it to frictionally engage and thereby lock the counterpoise, substantially as described.

50. In a weighing-machine, the combination with a pivoted scale-beam, a rolling counterpoise thereon, a falling bar for engaging said counterpoise in any intermediate position it may occupy on the scale-beam when indicating the weight, and means for releasing said bar permitting it to fall onto the rolling counterpoise to lock it, substantially as described.

51. In a weighing-machine, the combination with a pivoted scale-beam, a rolling counterpoise thereon, a bar pivoted to the scale-beam for engaging said counterpoise in any intermediate position it may occupy on the scale-beam when indicating the weight, and means for releasing said bar permitting it to engage and thereby lock the counterpoise, substantially as described.

52. In a weighing-machine, the combination with a pivoted scale-beam, a rolling counterpoise thereon, a graduated bar pivoted to the scale-beam for engaging said counterpoise in any intermediate position it may occupy on the scale-beam when indicating the weight, and means for releasing said bar permitting it to engage and thereby lock the counterpoise, substantially as described.

53. In a weighing-machine, the combination with a pivoted scale-beam, a rolling counterpoise thereon, a locking-device for locking the counterpoise in any intermediate position on the scale-beam it may occupy when indicating the weight, and means operated by a movement of the scale-beam for releasing said locking-device to lock the counterpoise, substantially as described.

54. In a weighing-machine, the combination with a pivoted scale-beam, a rolling counterpoise thereon, means for tilting the scale-beam to cause the counterpoise to roll along thereon, a locking-device for locking the counterpoise in any intermediate position on the scale-beam it may occupy when indicating the weight, and means operated by a movement of the scale-beam for releasing said locking-device to lock the counterpoise, substantially as described.

55. In a weighing-machine, the combination with a pivoted scale-beam, a rolling counterpoise thereon, a locking-device for locking the counterpoise in any intermediate position on the scale-beam it may occupy when indicating the weight, and for subsequently releasing it permitting it to resume its normal position, and means operated by a movement of the scale-beam for releasing said locking-device, substantially as described.

56. In a weighing-machine, the combination with a pivoted scale-beam, a rolling counterpoise thereon, means for tilting the scale-beam to cause the counterpoise to roll along thereon to indicate the weight, and means coextensive with the scale-beam for locking the counterpoise in any intermediate position on the beam it may occupy when indicating the weight, substantially as described.

57. In a weighing-machine, the combination with a pivoted scale-beam normally declining toward its outer end, a rolling counterpoise normally held at the outer end of said scale-beam, means for raising the outer end of the scale-beam to decline the scale-beam toward its inner end and cause the counterpoise to roll along thereon to indicate the weight, and means coextensive with the scale-beam for locking the counterpoise in any intermediate position on the scale-beam it may occupy when indicating the weight, substantially as described.

In testimony whereof, I have signed my name to this specification, in the presence of two subscribing witnesses.

CLIFFORD J. McLEOD.

Witnesses:
B. J. NOYES,
H. B. DAVIS.